(12) United States Patent
Chung et al.

(10) Patent No.: US 7,754,793 B2
(45) Date of Patent: Jul. 13, 2010

(54) FLAME RESISTANT POLYCARBONATE COMPOSITION

(75) Inventors: James Y. J. Chung, Wexford, PA (US); Rudiger Gorny, Moon Township, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 157 days.

(21) Appl. No.: 11/890,616

(22) Filed: Aug. 7, 2007

(65) Prior Publication Data

US 2009/0043023 A1  Feb. 12, 2009

(51) Int. Cl.
*B01D 63/06* (2006.01)
*C08L 69/00* (2006.01)

(52) U.S. Cl. ..................... 524/165; 525/146
(58) Field of Classification Search ................ 524/165
See application file for complete search history.

(56) References Cited

U.S. PATENT DOCUMENTS

| | | | |
|---|---|---|---|
| 4,093,589 A | 6/1978 | Factor et al. | 260/45.75 B |
| 4,174,432 A | 11/1979 | Niznik | 521/180 |
| 6,730,748 B2 * | 5/2004 | Chung et al. | 525/469 |
| 7,462,662 B2 | 12/2008 | Balfour et al. | |
| 2002/0177643 A1 | 11/2002 | Dobler et al. | |

FOREIGN PATENT DOCUMENTS

| | | |
|---|---|---|
| DE | 4232421 A1 | 3/1994 |
| KR | 10-2007-0070326 A | 7/2007 |
| KR | 1020070070326 * | 7/2007 |

OTHER PUBLICATIONS

Translation of DE4232421, Mar. 1994.*
Translation of KR 1020070070326, Jul. 2007.*

* cited by examiner

*Primary Examiner*—Ling-Siu Choi
*Assistant Examiner*—Hui Chin
(74) *Attorney, Agent, or Firm*—John E. Mrozinski, Jr.; Noland J. Cheung

(57) ABSTRACT

A thermoplastic molding composition that releases upon burning a limited amount of smoke is disclosed. The composition includes 95 to 60 percent aromatic (co)polycarbonate, 5 to 40 percent bromine-substituted oligocarbonate, and 0.04 to 0.2 percent alkali or alkaline-earth salt of perfluoroalkane sulfonic acid, the percents all occurrences being relative to the weight of the composition.

13 Claims, No Drawings

FLAME RESISTANT POLYCARBONATE COMPOSITION

FIELD OF THE INVENTION

The invention concerns polycarbonate compositions, more particularly a composition that upon burning releases limited amount of smoke.

BACKGROUND OF THE INVENTION

Flame retardant polycarbonate compositions are known and have found wide applicability in the architectural and transportation fields. The relevant patent literature includes dozens of issued patents including U.S. Pat. Nos. 4,174,432 and 4,093,589. Flame retardant agents suitable for polycarbonate are widely available in commerce.

Smoke suppression is often cited as one of the acceptance criteria for polymeric materials targeted for architectural or transport application and means to suppress smoke generated on burning have long been sought.

SUMMARY OF THE INVENTION

A thermoplastic molding composition that releases upon burning a limited amount of smoke is disclosed. The composition includes 95 to 60 percent aromatic (co)polycarbonate, 5 to 40 percent bromine-substituted oligocarbonate, and 0.04 to 0.2 percent alkali or alkaline-earth salt of perfluoroalkane sulfonic acid, the percents all occurrences being relative to the weight of the composition.

DETAILED DESCRIPTION OF THE INVENTION

The inventive thermoplastic molding compositions which exhibit low flammability, surprisingly low smoke generation contains 95 to 60 preferably 90 to 70 percent aromatic (co)polycarbonate,
  5 to 40 preferably 10 to 30 percent bromine-substituted oligocarbonate, and
  0.04 to 0.2 preferably 0.06 to 0.12, most preferably 0.06 to 0.09 percent alkali or alkaline-earth salt of perfluoroalkane sulfonic acid, the percents all occurrences being relative to the weight of the composition. A preferred embodiment concerns a transparent composition having total light transmission of at least 60% preferably 70% more preferably 85%, determined on a specimen 3.2 mm thick, in accordance with ASTM D-1003.

The term polycarbonate as used in the context of the present invention refers to homopolycarbonates and copolycarbonates (including polyestercarbonates). Polycarbonates are known and their structure and methods of preparation have been disclosed, for example, in U.S. Pat. Nos. 3,030,331; 3,169,121; 3,395,119; 3,729,447; 4,255,556; 4,260,731; 4,369,303, 4,714,746 and 6,306,507 all of which are incorporated by reference herein. The polycarbonates generally have a weight average molecular weight of 10,000 to 200,000, preferably 19,000 to 80,000 and their melt flow rate, per ASTM D-1238 at 300° C., is about 1 to about 65 g/10 min., preferably about 2 to 35 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

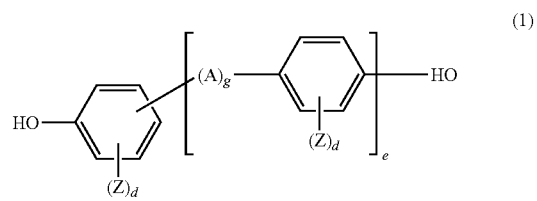

(1)

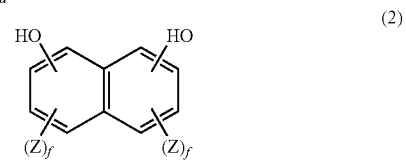

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a single bond, a carbonyl group, an oxygen atom, a sulfur atom, —SO— or —SO$_2$ or a radical conforming to

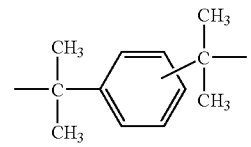

e and g both denote the number 0 to 1;

Z denotes F, Cl, Br or C$_1$-C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4- hydroxyphenyl)-cyclohexane, α,α'-bis-(3,5-dimethyl-4-hydroxyphenyl)-p-diisopropyl-benzene, 1,1-bis-(4-hydroxyphenyl)-3,3,5-trimethylcyclohexane, 4,4'-dihydroxydiphenyl, and 4,4'-sulfonyl diphenol.

Examples of particularly preferred bisphenols are 2,2-bis-(4-hydroxyphenyl)-propane, 2,2-bis-(3,5-dimethyl-4-hydroxy-phenyl)-propane; 1,1-bis-(4-hydroxyphenyl)-cyclohexane and 4,4'-dihydroxydiphenyl and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more aromatic dihydroxy compounds.

The polycarbonates of the invention may also be branched by condensing therein small quantities, e.g., 0.05 to 2.0 mol % (relative to the bisphenols) of polyhydroxyl compounds as branching agents. Such branching agents suitable in the context of polycarbonate are known and include the agents disclosed in U.S. Pat. Nos. 4,185,009; 5,367,044; 6,528,612; and 6,613,869 incorporated herein by reference, preferred branching agents include isatin biscresol and 1,1,1-tris-(4-hydroxyphenyl)ethane (THPE).

The bromine substituted oligocarbonate of the invention includes at least some structural units conforming to

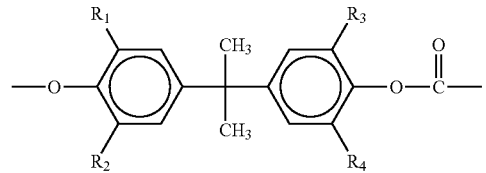

where $R_1$, $R_2$, $R_3$ and $R_4$ independently one of the others denote H, Br or $CH_3$ with the proviso that at least one of $R_1$, $R_2$, $R_3$, $R_4$ denotes Br. In a preferred embodiment the oligocarbonate includes end groups selected from the group consisting of phenyl, p-tert-butylphenyl, cumyl, nonylphenyl, and iso-nonylphenyl radicals.

Most suitable is the oligocarbonate having bromine content greater than 40 percent, preferably 50 to 55 percent relative to its weight and conforming to

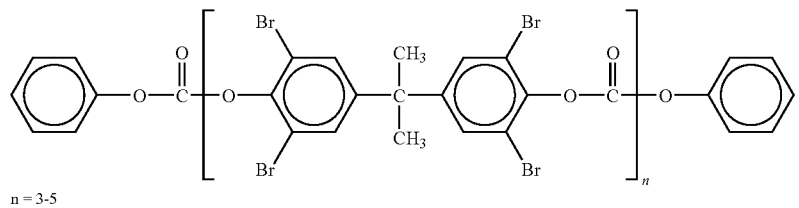

n = 3-5

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in U.S. Pat. Nos. 3,028,365; 2,999,846; 3,153,008; and 2,991,273 all incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used.

Suitable polycarbonate resins are available in commerce, for instance, under the Makrolon trademark from Bayer MaterialScience LLC of Pittsburgh, Pa.

The inorganic salt suitable in the context of the inventive composition is alkali or alkaline-earth salt of perfluoroalkane sulfonic acid. Examples of such salt include sodium and potassium perfluorobutane sulfonate, sodium and potassium perfluoromethylbutane sulfonate, sodium and potassium perfluorooctane sulfonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulfonate, tetraethylammonium perfluoromethylbutane sulfonate and the like and mixtures thereof.

Such sulfonates or mixtures thereof may be added to the polycarbonate during its preparation or they may be added to the melt of the finished polycarbonate by homogenization using an extruder, for example, or by any other suitable means which will insure a thorough distribution in the polycarbonate resin. Some such suitable methods are described, for example, in U.S. Pat. No. 3,509,091, incorporated herein by reference.

The inventive composition may further contain one or more conventional functional additives such as antistatic agents, antioxidants, additional flame retardant agents, lubricants, mold release agents, colorants, optical brighteners and UV stabilizers. Suitable UV absorbers include hydroxybenzophenones, hydroxybenzotriazoles, hydroxybenzotriazines, cyanoacrylates, oxanilides, and benzoxazinones. Suitable stabilizers include carbodiimides, such as bis-(2,6-diisopropylphenyl) carbodiimide and polycarbodiimides; hindered amine light stabilizers; hindered phenols (such as Irganox 1076 (CAS number 2082-79-3), Irganox 1010 (CAS number 6683-19-8); phosphites (such as Irgafos 168, CAS number 31570-04-4; Sandostab P-EPQ, CAS number 119345-01-6; Ultranox 626, CAS number 26741-53-7; Ultranox 641, CAS number 161717-32-4; Doverphos S-9228, CAS number 154862-43-8), triphenyl phosphine, and phosphorous acid. Suitable hydrolytic stabilizers include epoxides such as Joncryl ADR-4368-F, Joncryl ADR-4368-S, Joncryl ADR-4368-L, cycloaliphatic epoxy resin ERL-4221 (CAS number 2386-87-0). Suitable additional flame retardants include phosphorus compounds such as tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, methylphosphonic acid dimethyl esters, methylphosphonic acid diphenyl esters, phenylphosphonic acid diethyl esters, triphenylphosphine oxide, tricresylphosphine oxide and halogenated compounds.

Such stabilizer additives are known in the art and are disclosed in standard reference works such as "Plastics Additives Handbook", 5$^{th}$ edition, edited by H. Zweifel, Hanser Publishers incorporated herein by reference. The additives may be used in effective amounts, preferably of from 0.01 to a total of about 30% relative to the total weight of the polycarbonate.

The inventive molding composition is suitable for articles by any of the thermoplastic processes, including injection molding and extrusion.

EXPERIMENTAL

The compositions described below were prepared conventionally and tested. The materials used in preparing the exemplified compositions were:

Polycarbonate: Makrolon 2808 a homopolycarbonate based on bisphenol A, melt flow index of 10 g/10 min, a product of Bayer MaterialScience LLC. (melt flow index is determined at 300° C., 1.2 kg according to ASTM D-1238)

TBOC: tetra-brominated oligocarbonate based on bisphenol A conforming to

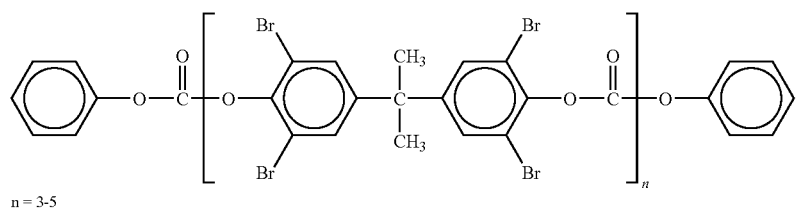

n = 3-5 a product of Chemtura Corporation.

Salt: Potassium perfluorobutanesulfonate.

The preparation of the compositional was conventional and followed procedures that are well known in the art.

The impact strength reported below was determined in accordance with ASTM D-256 and flexural modulus was determined in accordance with ASTM D-790. Smoke suppression and heat release properties were determined in accordance with ASTM E-1354.

The table below shows the makeup of the exemplified compositions. The polycarbonate content of each of these compositions was the balance to 100 percent.

TABLE 1

| Composition | 1 | 2 | 3 | 4 |
| --- | --- | --- | --- | --- |
| TBOC, wt. % | 10 | 30 | 10 | 30 |
| Salt, wt. % | — | — | 0.08 | 0.08 |
| Properties | | | | |
| Flame retardance, UL94 @ 2 mm | V-2 | V-0 | V-2 | V-0 |
| Impact Strength, Notched Izod (ft-lb/in) @ ⅛" | 2.1 | 0.9 | 2.0 | 0.8 |
| Flexural modulus, GPa | 2.5 | 2.8 | 2.6 | 2.9 |
| HRR @ peak, kW/m$^2$ | 379 | 312 | 423 | 290 |
| Total heat evolved, kJ | 304 | 215 | 382 | 250 |
| Total Smoke Released, m$^2$/m$^2$ | 2915 | 3014 | 2268 | 2598 |

The data show the surprisingly lower level of released smoke that characterize the inventive compositions, set in comparisons to corresponding compositions that contain no salt.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising 95 to 60 percent aromatic (co)polycarbonate, 10 to 30 percent bromine-substituted oligocarbonate, and 0.04 to 0.2 percent alkali or alkaline-earth salt of perfluoroalkane sulfonic acid, the percents all occurrences being relative to the weight of the composition.

2. The composition of claim 1 wherein the (co)polycarbonate is present in an amount of 90 to 70 percent relative to the weight of the composition.

3. The composition of claim 1 wherein the salt is present in an amount of 0.06 to 0.12 percent relative to the weight of the composition.

4. The composition of claim 1 wherein the (co)polycarbonate is derived from at least one member selected from the group consisting of 2,2-bis-(4-hydroxyphenyl)-propane, 2,2-bis-(3,5-dimethyl-4-hydroxy-phenyl)-propane; 1,1-bis-(4-hydroxyphenyl)-cyclohexane and 4,4'-dihydroxydiphenyl.

5. The composition of claim 1 wherein the oligocarbonate contains at least some structural units conforming to

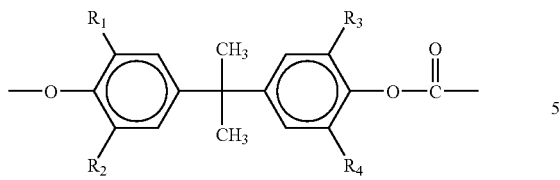

wherein $R_1$, $R_2$, $R_3$ and $R_4$, independently one of the others denote H, Br, or $CH_3$ with the proviso that at least one of $R_1$, $R_2$, $R_3$, $R_4$ is Br.

6. The composition of claim 5 wherein said oligocarbonate contains end groups selected from the group consisting of phenyl, p-tert-butylphenyl, cumyl, nonyl phenyl and iso-nonyl phenyl radicals.

7. The composition of claim 1 wherein the oligocarbonate conforms structurally to

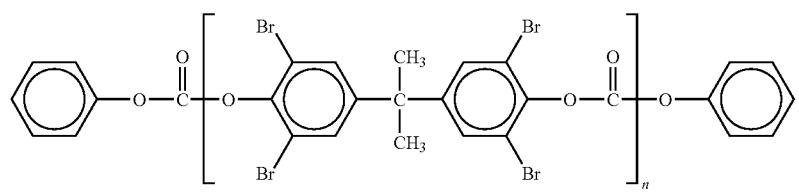

where n is 3 to 5.

8. The composition of claim 1 wherein the salt is at least one member selected from the group consisting of sodium perfluorobutane sulfonate, potassium perfluorobutane sulfonate, sodium perfluoromethylbutane sulfonate, potassium perfluoromethylbutane sulfonate, sodium perfluorooctane sulfonate, potassium perfluorooctane sulfonate, sodium perfluoromethane sulfonate, potassium perfluoromethane sulfonate, sodium perfluoroethane sulfonate, potassium perfluoroethane sulfonate, sodium perfluoropropane sulfonate, potassium perfluoropropane sulfonate, sodium perfluorohexane sulfonate, potassium perfluorohexane sulfonate, sodium perfluoroheptane sulfonate, potassium perfluoroheptane sulfonate, tetraethylammonium perfluorobutane sulfonate, and tetraethylammonium perfluoromethylbutane sulfonate.

9. A thermoplastic molding composition comprising 90 to 70 percent aromatic (co)polycarbonate, 10 to 30 percent bromine-substituted oligocarbonate conforming to

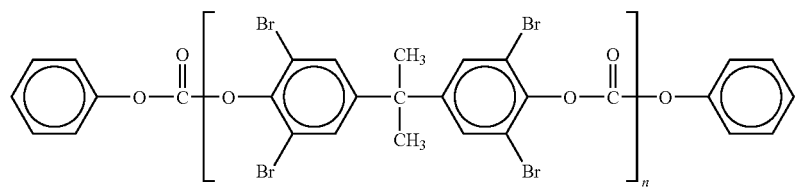

n = 3-5 and 0.06 to 0.12 percent potassium perfluorobutane sulfonate, the percents all occurrences being relative to the weight of the composition.

10. A transparent thermoplastic molding composition comprising 90 to 70 percent aromatic (co)polycarbonate, 10 to 30 percent bromine-substituted oligocarbonate conforming to

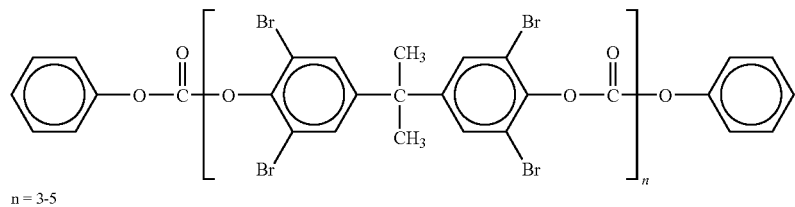

n = 3-5 and 0.06 to 0.09 percent potassium perfluorobutane sulfonate, the percents all occurrences being relative to the weight of the composition, said composition having total light transmission of at least 85%, determined on a specimen 3.2 mm thick, in accordance with ASTM D-1003.

11. An article of manufacture comprising the composition of claim 1.

12. An article of manufacture comprising the composition of claim 9.

13. An article of manufacture comprising the composition of claim 10.

* * * * *